United States Patent
Smith

(10) Patent No.: US 6,859,162 B2
(45) Date of Patent: Feb. 22, 2005

(54) UNDERGROUND OBJECT LOCATING SYSTEM WITHOUT DIRECTION AMBIGUITY

(75) Inventor: Kenneth R. Smith, Sunnyvale, CA (US)

(73) Assignee: Geometrics, Inc., San Jose, CA (US)

(*) Notice: Subject to any disclaimer, the term of this patent is extended or adjusted under 35 U.S.C. 154(b) by 285 days.

(21) Appl. No.: 10/077,234

(22) Filed: Feb. 15, 2002

(65) Prior Publication Data

US 2003/0156042 A1 Aug. 21, 2003

(51) Int. Cl.$^7$ .......................... G01S 13/88; G01S 13/04; G01S 13/00
(52) U.S. Cl. ............................ 342/22; 342/27; 342/82; 342/89; 342/175; 375/130
(58) Field of Search .................. 342/82–103, 159, 342/165, 173, 174, 21, 22, 27, 28, 118, 119–147, 175, 192–197; 375/130–153

(56) References Cited

U.S. PATENT DOCUMENTS

| | | | |
|---|---|---|---|
| 3,967,282 A | * | 6/1976 | Young et al. .................. 342/22 |
| 4,062,010 A | * | 12/1977 | Young et al. .................. 342/22 |
| 5,592,170 A | * | 1/1997 | Price et al. .................... 342/22 |
| 6,037,784 A | | 3/2000 | Smith |
| 6,211,807 B1 | | 4/2001 | Wilkison |

* cited by examiner

Primary Examiner—Bernarr E. Gregory
(74) Attorney, Agent, or Firm—Beyer Weaver & Thomas LLP

(57) ABSTRACT

In an underground object locating system in which a modulated RF signal is applied to the underground object and an emitted signal is detected by a receiver, ambiguity in the direction of current flow in the underground object is resolved by modulating the RF signal with a modulation signal such that the modulated signal, f(t) has an average value of zero and is not equal to −f(t+K) where K is any practical value. In specific embodiments, the modulation can be amplitude modulation where the modulating signal is lower in frequency than the RF signal and is related thereto by a rational number, such as one-half (½).

25 Claims, 1 Drawing Sheet

UNDERGROUND OBJECT LOCATING SYSTEM WITHOUT DIRECTION AMBIGUITY

BACKGROUND OF THE INVENTION

This invention relates generally to locating underground objects, and more particularly the invention relates to radio transmission and reception in object locating systems and soil conductivity measurement systems without a direction ambiguity.

Buried pipes and conduits are used by a large number of utility companies including telephone, water, gas, CATV, and electric power. Frequently it becomes necessary to excavate in an area where one or more of these conduits have been placed. It also becomes necessary to repair broken or leaky conduits. Conversely, it is important to know the location of each of the conduits or pipes before any digging or excavation begins.

In order to facilitate the replacement and repair of buried utility system it is important to have a simple and quick method of locating the true position of the buried conduits. Most buried utility systems are constructed of materials through which an electric current can flow, and whenever a current flows a magnetic field is created. In cases where a pipe or conduit is made of a non-conductive or non-magnetic material, there is typically a wire or metal line placed in direct proximity therewith. AC currents can be induced in the conductive wire or pipe thus producing an AC magnetic field.

Soil conductivity measurements are often used for geophysical surveys. In this situation the conductive object would be something such as an ore body for which one may wish to create a map. Such systems can also detect less conductive bodies, such as tunnels, within more conductive materials.

There are a number of existing devices which are used to locate buried or otherwise concealed electrically conductive objects. The devices use an alternating current which is impressed on the concealed conductive object, such as a pipe or cable, by direct connection or by inductive coupling. The object can be located in a horizontal underground plane or in a lateral plane by use of a suitable horizontal axis pickup coil and amplifier with an appropriate indicating device such as a meter or audio transducer. When the receiver pickup coil is brought closer to the object being investigated, the AC signal level increases and the position nearest the object produces the strongest signal. Soil conductivity measurement systems typically use electrical contacts with the soil in place of the inductive pickup used in the utility locator case.

In such systems there can be an ambiguity in the received signal measurement. Since the signal is a sinusoid and no phase reference is brought from the transmitter to the receiver, there is no sign information in the received signal. The ambiguity arises because $\sin(t) = -\sin(t+\pi)$.

In simple environments, assuming that the power is always flowing away from the transmitter, the received signal will give the correct results in identifying an underground object. In more complex physical arrangements, however, such as where a pipe makes a U-turn, the ambiguity can cause confusion.

Consider for example the arrangement in FIG. 1 where a pipe 10 has a reversal of direction at location 12 (a building for example) and extends at 10' generally parallel to pipe 10. A signal detector might confuse signals from pipe 10 and pipe 10' even though current is flowing in the two pipes in opposite directions. Thus, the operator might confuse pipe 10' in locating pipe 10.

The present invention is directed to avoiding this ambiguity.

BRIEF SUMMARY OF THE INVENTION

In accordance with the invention, an underground object locating system has a transmitter for applying to an object an RF signal which has an average value of zero, but in which the time function of the transmitted RF signal is not equal to a negative of the time function and any time offset of the time function.

More particularly, in one embodiment of the invention to achieve the function $$f(t) \neq -f(t+K) \qquad [12]$$

for any value of K, the RF signal includes a carrier frequency ($V_0$) which is modulated by a lower frequency ($V_1$). The modulating signal, $V_1$, is a rational fraction (K1) of and at a known phase with respect to the carrier signal, $V_0$.

A receiver detects and demodulates the carrier $V_0$ to obtain the modulating signal $V_1$. The phase relationship between the detected $V_0$ and $V_1$ signals will either be the same as in the transmitter or shifted by 180°. This phase shift indicates the sign of current flow. If current is flowing away from the transmitter, the phase will be unchanged. However, if current is flowing towards the transmitter the phase will be shifted by 180°.

The invention and objects and features thereof will be more readily apparent from the following detailed description and appended claims when taken with the drawings.

BRIEF DESCRIPTION OF THE DRAWINGS

FIGS. 2, 3, 4 are wave forms illustrating transmitted waves in accordance with the invention, received waves with current flow from the transmitter, and received waves with carrier flowing towards the transmitter, respectively.

DETAILED DESCRIPTION OF ILLUSTRATIVE EMBODIMENT

Figure 1:
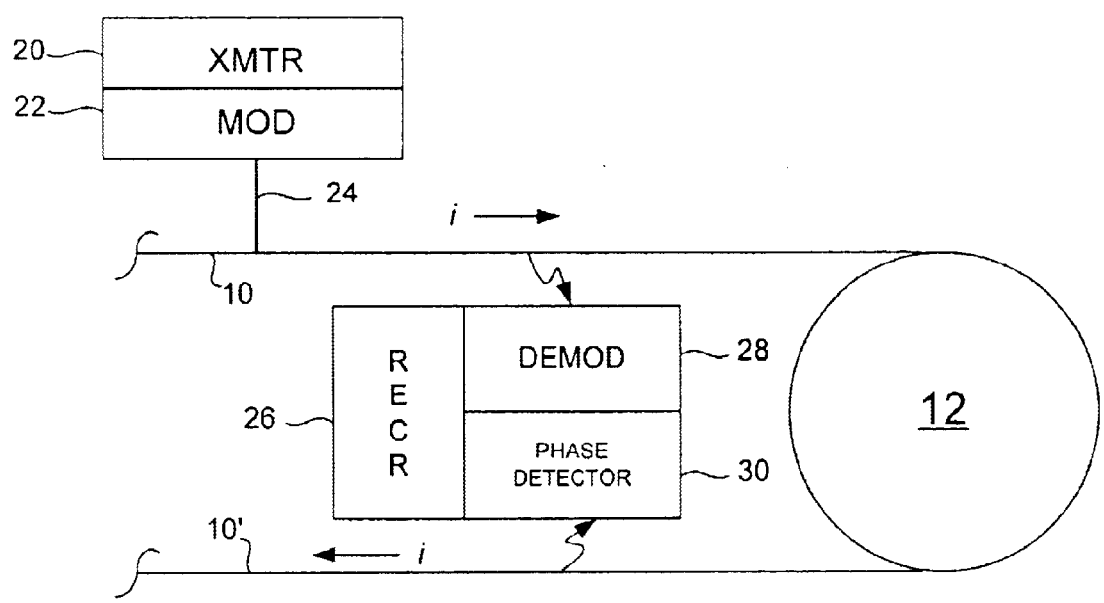
FIG. 1 is a diagrammatic view of an underground object and an RF signal detection system.

In the following illustrative embodiment, it will be assumed that modulation is AM and that the ratio K1 is ½. Further, square-waves are illustrated rather than sine waves for illustration purposes.

The transmitter signal waveforms are illustrated in FIG. 2 where the RF signal $V_0$ and the modulating signal, $V_1$ are illustrated. The amplitude modulated transmitter output is illustrated by a signal having a varying amplitude depending on the phases of $V_0$ and $V_1$. In carrying out the invention, in FIG. 1 transmitter 20 including modulator 22 transmits a modulated signal through coupler 24 to pipe 10, and receiver 26 including demodulator 28 and phase detector 30 receive the modulated signal emitted from pipe 10 and from pipe 10'.

In FIG. 3, a receiver receives the reflected waves in the normal case, such as from pipe 10 in FIG. 1 where the current is flowing away from the transmitter. The received signal $V_0$ and the recovered modulation signal $V_1$ correspond to the transmitter output and the modulation signal $V_1$ of FIG. 2. The recovered modulation signal (assuming K1=½) is multiplied by 2 to be at the frequency of the transmitter as shown. It would be noted that the recovered modulation multiplied by 2 is in phase with the received signal $V_0$, that is both signals go positive together.

Consider now FIG. 4 where the received signal is from pipe 10' in FIG. 1 with the current in pipe 10' flowing opposite to the current in pipe 10. The received signal $V_0$ is now inverted from the received signal in FIG. 3 and the recovered modulation signal $V_1$ is now 180° out of phase with the received signal. Again, two times the recovered modulation signal, as illustrated, is 180° out of phase with respect to the received signal $V_0$.

Thus, in accordance with the invention the receiver detects the effect of $V_0$ from the environment and decodes the modulation signal $V_1$, where the phase relationship between $V_0$ and $V_1$ will either be the same as in the transmitter or 180° shifted from the transmitter. This phase shift indicates the sign. If the current is flowing away from the transmitter the phase will be zero, and if the current is flowing towards the transmitter the phase will be 180° shifted.

The illustrative embodiment is a simple case of amplitude modulation where the modulating signal frequency is one-half the transmitter frequency. However, other modulation techniques can be employed including pseudo random sequences and ultrawide bandwidths along with spread spectrum so long as the periodic function, f(t), is such that f(t)=f(t+K) is not true for any practical value of K. f(t)=f(t+K) can be true for values of K so large as to represent operation on a different day.

Thus, while the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In a system for locating electrically conductive underground objects by the reception of radio waves created by current flow through the underground object, a method of removing ambiguity of direction of current flow in the object comprising the steps of:
    a) creating an RF signal, f(t), including a modulation signal and having an average value of zero and such that $$f(t) \neq f(t=K)$$

where K in an arbitrarily selected number,
    b) applying the RF signal to the underground object to cause a current to flow through the underground object,
    c) detecting a received RF signal including the modulation signal emitted from the object, and
    d) decoding the received RF signal to recover the modulation signal and comparing relative phase of the applied RF signal to the modulation signal and relative phase of the received RF signal and the recovered modulation signal to ascertain direction of current flow through the object.

2. The method as defined by claim 1 wherein in step (a) the RF signal is a signal, $V_0$, which is modulated by a signal, $V_1$, and in step d) the detected radio waves are demodulated and the phase of the signal, $V_1$, is compared to the phase of the detected RF signal.

3. The method as defined by claim 2 wherein the signal, $V_1$, is lower in frequency that the signal, $V_0$, and is related in frequency thereto by a rational member.

4. The method as defined by claim 3 wherein the rational number is one-half (½).

5. The method as defined by claim 3 wherein step a) includes amplitude modulating the signal, $V_0$, by the signal, $V_1$.

6. The method as defined by claim 2 wherein step a) includes use of spread spectrums.

7. The method as defined by claim 6 wherein step a) includes use of a pseudo random frequency sequence, wherein each frequency is related to the frequency of signal, $V_0$, by a rational number.

8. The method as defined by claim 1 wherein the electrically conductive object is a pipe.

9. The method as defined by claim 1 wherein the electrically conductive object is a wire within a pipe.

10. In a system for locating electrically conductive underground objects by the reception of radio waves emitted by the underground object, a method of removing ambiguity of direction of current flow in the object comprising the steps of:
    a) providing an RF signal, $V_0$,
    b) modulating the RF signal by a modulation signal, $V_1$, such that a modulated signal, f(t) has an average value of zero and is not equal to −f(t+K) where K is any value,
    c) applying the modulated signal to the underground object to cause a current to flow in the underground object,
    d) detecting a received RF signal including the modulation signal emitted from the object, and
    e) decoding the received RF signal to obtained a recover the modulation signal and comparing relative phase of the applied RF signal to the modulation signal and relative phase of the received RF signal and the recovered modulation signal to determine direction of current flow through the underground object.

11. The method as defined by claim 10 wherein step b) includes amplitude modulating the RF signal with the modulation signal.

12. The method as defined by claim 11 wherein the modulation signal is lower in frequency than the RF signal and is related thereto by a rational number.

13. The method as defined by claim 12 wherein the rational number is ½.

14. The method as defined by claim 10 wherein step b) includes use of spread spectrum.

15. The method as defined by claim 14 wherein step b) includes use of a pseudo random frequency sequence, wherein each frequency is related to the RF signal frequency by a rational number.

16. The method as defined by claim 10 wherein the electrically conductive object is a pipe.

17. The method as defined by claim 10 wherein the electrically conductive object is a wire within a pipe.

18. A system for locating electrically conductive underground objects by the reception of radio waves emitted by the underground object comprising:
    a) a transmitter for applying to the underground object an RF signal, $V_0$, and including a modulator for modulating the RF signal by a modulation signal, $V_1$, such that the modulated RF signal, f(t) has an average value of zero and is not equal to −f(t+K) where K is an arbitrarily selected number, b) a coupler for coupling the modulated RF signal to the underground object, c) a receiver for receiving the modulated RF signal as emitted from the underground object, d) a demodulator for recovering the modulation signal, $V_1$, and the received RF signal $V_0$, and e) a phase detector for detecting the phase of the received RF signal relative to the phase of the recovered modulation signal, wherein phase, of the received modulated RF signal relative to the recovered modulation signal and phase of the transmitted RF signal relative to the modulation signal determines direction of current flow in the underground object.

19. The system as defined by claim 18 wherein the RF signal, $V_0$, is amplitude modulated by the modulation signal, $V_1$.

20. The system as defined by claim 19 wherein the modulation signal is lower in frequency than the RF signal and is related thereto by a rational number.

21. The system as defined by claim 20 wherein the rational number is one-half (½).

22. The system as defined by claim 18 wherein the modulator modulates the RF signal by use of spread spectrum.

23. The system as defined by claim 22 wherein the spread spectrum modulation includes use of a pseudo random frequency sequence wherein each frequency is related to the signal frequency of the RF signal, $V_0$, by a rational number.

24. The system as defined by claim 18 wherein the electrically conductive object is a pipe.

25. The system as defined by claim 18 wherein the electrically conductive object is a wire within a pipe.

* * * * *